(12) United States Patent
Öjerstav et al.

(10) Patent No.: US 10,033,170 B2
(45) Date of Patent: Jul. 24, 2018

(54) HYBRID CABLE TRAY AND MANUFACTURING METHOD OF THE SAME

(71) Applicant: SCHNEIDER ELECTRIC INDUSTRIES SAS, Rueil-Malmaison (FR)

(72) Inventors: Jan Öjerstav, Mora (SE); Rolf Wesgardh, Mora (SE)

(73) Assignee: Schneider Electric Industries SAS, Rueil-Malmaison (FR)

( * ) Notice: Subject to any disclaimer, the term of this patent is extended or adjusted under 35 U.S.C. 154(b) by 0 days.

(21) Appl. No.: 15/129,221

(22) PCT Filed: Mar. 27, 2014

(86) PCT No.: PCT/EP2014/056179
§ 371 (c)(1),
(2) Date: Sep. 26, 2016

(87) PCT Pub. No.: WO2015/144227
PCT Pub. Date: Oct. 1, 2015

(65) Prior Publication Data
US 2017/0110861 A1    Apr. 20, 2017

(51) Int. Cl.
*H02G 3/04* (2006.01)
(52) U.S. Cl.
CPC ................... *H02G 3/0456* (2013.01)
(58) Field of Classification Search
None
See application file for complete search history.

(56) References Cited

U.S. PATENT DOCUMENTS

| 2,917,259 | A |   | 12/1959 | Hill |   |
|---|---|---|---|---|---|
| 3,521,843 | A | * | 7/1970 | Ogle | F16L 3/26 |
|   |   |   |   |   | 174/68.3 |
| 7,425,682 | B2 | * | 9/2008 | Rasmussen | G06F 1/189 |
|   |   |   |   |   | 174/480 |

FOREIGN PATENT DOCUMENTS

| DE | 79 27 0807 U1 | 4/1980 |
|---|---|---|
| EP | 2 234 230 A2 | 9/2010 |

(Continued)

OTHER PUBLICATIONS

International Preliminary Report of Patentability regarding PCT/EP2014/056179, dated Jul. 25, 2016, 21 pps.

(Continued)

*Primary Examiner* — Dimary Lopez Cruz
(74) *Attorney, Agent, or Firm* — Foley & Lardner LLP

(57) ABSTRACT

Hybrid cable tray comprising a first part (13) constituting one piece having a uniform thickness. The first part (13) forming at least a first support surface (52) of a first accommodation (53) for the plurality of cables (54). The first part (51) having a plurality of first through holes (15) formed by a first plurality of edges (20) in the first part (13). The cable tray (10) having two parallel extending side bars (11, 12) connected to each other by said first part (13). The said side bars comprise an inner side (111, 121) connected to the said first part (13) and provided with at least one closed top side (113, 123) and one outer side (112, 122) where the inner side and the outer side have about the same width (W). The side bars have an open bottom side (55, 56). The invention also covers a method of manufacturing such a hybrid cable tray (10).

15 Claims, 2 Drawing Sheets

(56) References Cited

FOREIGN PATENT DOCUMENTS

RU           85269      7/2009
WO    WO 2006/076746 A1    7/2006

OTHER PUBLICATIONS

International Search Report regarding PCT/EP2014/056179, dated Nov. 24, 2014, 4 pps.

\* cited by examiner

HYBRID CABLE TRAY AND MANUFACTURING METHOD OF THE SAME

CROSS-REFERENCE TO RELATED APPLICATIONS

The present Application is a U.S. national entry stage of, and claims priority to, and the benefit of, International Application No. PCT/EP2014/056179, filed on Mar. 27, 2014. International Application No. PCT/EP2014/056179 is incorporated herein by reference in its entirety.

TECHNICAL FIELD

The present invention relates to the field of cable trays and cable ladders for supporting electric cables and wires

BACKGROUND OF THE INVENTION

Cable trays of the wire type are previously well known and these are also known as wire trays since they are produced from separate wires which have been welded or soldered together in perpendicular angles towards each other. Such conventional wire trays are for example disclosed in the document WO 2005/090846.

Since the production of such wire trays requires a welding or soldering process the time of production is comparatively long and therefore also costly. Also the weight of such conventional wire trays is comparatively high since the longitudinal bars are processed separately and are later attached to the cross members.

In the technical field of cable trays there are also previously known trays with bent longitudinal side bars and perforated bottoms, for example such as those known by GB 1292997. These types of cable trays which are punched and bent from a flat sheet of material do not provide enough flexural rigidity, neither in the transversal direction not in the longitudinal direction, for heavy cable and wires.

OBJECT OF THE INVENTION

One object of the invention is to provide a new type of one piece cable tray

A further object is to provide such a new type of cable tray having approximately the same physical properties such as "wire" diameter, dimensions and bending strength as conventional wire trays.

A further object of the invention is to provide such a new type of cable tray which can be more rapidly and more cost effectively produced.

Also an object of the invention is to produce such a cable tray that is lighter than previously known wire trays.

An object is also to produce such a new type of cable tray from a steel coil.

A further object of the invention is to provide such a new type of cable tray having a plurality of first through holes formed by a first plurality of edges directed and protruding with an angle away from a support surface in the cable tray.

A further object of the inventions is to provide such a new cable tray having properties suitable for a hybrid use. Such a use was previously adopted for ether a conventional cable ladder, a conventional cable tray or a conventional wire tray.

DISCLOSURE OF THE INVENTION

These objects are achieved by means of the present invention as defined in the accompanying independent patent claims. Suitable further embodiments of the invention will be apparent from the accompanying dependent claims.

In the following description the terms "cable tray" is used for a wider range of products than the common used term. "Cable tray" in this application covers products having two parallel side bars which are connected by one or several connecting elements. In a case where one connecting element is provided this connecting element is of a mesh type. In a case where several connecting elements are provided these connecting elements are formed as rungs similar to conventional cable ladders. However, these connecting elements are produced from a single coil together with the parallel side bars as a one piece element.

The invention relates to a cable tray having two parallel extending side bars connected to each other by a first part being a connecting element. Each side bar is produced from a bent metal sheet, wherein the bar comprise an inner side connected to the said connecting element and with at least one closed top side and one outer side where the inner side and the outer side have about the same width and that the side bar is bent so that it has an open bottom side. The connecting element might be formed either as several rungs or as a mesh type of element. In either of these embodiments the connecting element is produced from a single metal sheet by punching and forming to reach its final shape. Preferably this connecting element together with both side bars is formed from the same single metal sheet.

More specifically the invention relates to a hybrid cable tray comprising a first part constituting one piece having a uniform thickness. This one piece is preferably a flat metal sheet material. The first part of the cable tray forming at least a first support surface of a first accommodation for a plurality of cables. The first part having a plurality of first through holes formed by a first plurality of edges. The cable tray having two parallel extending side bars connected to each other by said first part. The said side bar comprises an inner side connected to the said first part and with at least one closed top side and one outer side. The inner side and the outer side preferably have about the same width and the side bar has an open bottom side.

In one embodiment of the invention at least one side bar, preferably both side bars, is formed from said one piece.

In one embodiment of the invention at least a part of each said edge protrudes and is directed with an angle δ away from the support surface of the first accommodation, where 45°<δ<180°.

In one embodiment of the invention the complete edge of at least one through hole having the angle δ within the said range from the said support surface.

In one embodiment of the invention the complete edge of at least two adjacent through holes in the first part having the angle δ within the said range from the said support surface.

In one embodiment of the invention said through holes are formed and located in relation to each other so that the said edges of two adjacent through holes defines a tray member formed as a beam with longitudinally uniform cross shape at least partly between adjacent located holes. Preferably, the beam has a cross section in the form of a U-profile. Such a profile makes the cable ladder strong and rigid against twisting. Preferably, the open side of the U-profiled beams is oriented towards the outside of the ladder. Such an embodiment will eliminate the risk of damaging the isolating cover of an electrical cable since a smooth surface of the ladder is faced towards the cables. However, other cross sectional forms is possible within the scope of the invention.

Preferably, the smallest width of the smallest opening, i.e. through hole, has a width that is larger than the width of any ladder member. In this embodiment the openings can be of different sizes but large enough to be produced by a punching and forming process. Preferably the sizes of the openings compared to the sizes of the ladder members corresponds almost to the sizes of a conventional wire tray in which the length of an opening can be 20 times the diameter of the wires. In the present embodiment the preferred length of the opening is in the range of 5-25, preferably 15 times larger than the width of any cable tray member.

In one embodiment of the invention all ladder members have approximately the same cross sectional form and cross sectional size.

In one embodiment of the invention the first cable tray members has a longitudinally elongation and the second cable tray members has a transversally elongation. In this embodiment the form of the openings are preferably rectangular but can also be quadratic.

In one embodiment of the invention the closed top side of a side bar consists of two flat surfaces angled towards each other and together providing a top edge of the side bar. Preferably these two flat surfaces are symmetrically arranged in the side bar. The two flat surfaces are arranged with an angle α towards each other where the angle α is in the interval of 45-60°, preferably α=50°. Together the two flat surfaces are providing a top edge of the closed top side of the side bar. In this embodiment parts of the side bar corresponds to a conventional cable ladder with a closed side bar having a symmetrical cross sectional form with six sides. Having parts with this cross sectional form makes it possible to use common attachment and fastening means for this new type of cable tray.

In one embodiment of the invention the closed top side of the said side bar consists of a single flat surface, preferably having identical angles towards the inner side and towards the outer side of each side bar.

In one embodiment of the invention the outer side of the bar is provided with an outer rim extending substantially perpendicular out from the bottom edge of the outer side of the bar. Such an outer rim makes the edge at the open side of the side bar stiffer to prevent bending of that edge. This outer rim also provides a flat bottom surface for the side bar which is favorable when mounting the cable tray.

In one embodiment of the invention the inner side of the bar is provided with an inner rim extending substantially perpendicular inwards from the bottom edge of the inner side of the bar and to which inner rim the first part, being the connecting element between the side bars, is attached. Also this inner rim makes the inner edge at the open side of the side bar stiffer to prevent bending of that inner edge. This inner rim also provides a flat bottom surface for the side bar which is favorable when mounting the cable tray. As previously indicated the inner rim of the side bar might be attached to the first part either as having being made from the same one piece having a uniform thickness or by an attaching operation connecting separate parts together, preferably by a welding process or the like.

In one embodiment of the invention the inner side and/or the outer side of the bar is provided with attachment means. Such attachment means is arranged as circular and/or elongate formed holes which serve as mounting holes for all kind of products such as joints, couplings, hooks etc. These attachments means can easily be produced in the same process step for punching holes/openings in the rest of the cable tray. Thus these attachment means are provided as mounting holes of various form, arrangement and size which have been produced in a punching operation simultaneously with the punching operation for the through holes in the first part. The closed top side surface/surfaces of the bar can also be provided with such attachment means.

In one embodiment of the invention all parts of the cable tray are produced from one single sheet of metal, preferably of a steel coil. Thus, no welding operation is necessary between the first part and the side bars, respectively.

In one embodiment of the invention the production method of the cable tray involves a punching and a forming operation as well as a bending operation.

The invention also relates to a method of manufacturing a hybrid cable tray, example for supporting electrical wires. The method starts with a flat metal sheet starting material having one side surface as a support side for an accommodation for a plurality of cables. The sheet material being processed by the following steps:

a) the metal sheet material being punched with a plurality of through holes (15) having a plurality of edges. Some of these through holes can serve as holes for mounting and fastening means in the first part and/or in both or any of attached side bars.

b) bending at least a part of said edge an angle δ away from the support surface;

c) bending a flat side area of the metal sheet into a longitudinal side bar or attaching a longitudinal side bar to the metal sheet.

In one embodiment of the invention, the method steps are modified as follows:

in step a) the metal sheet material is punched with holes which are separated by strips;

and in step b) the strips are being formed into U-shaped beams or beams with other cross sectional forms defined as tray members.

In one embodiment of the invention also an opposite flat side area of the metal sheet is bent into a longitudinal side bar.

In one embodiment of the invention, step a) also involves punched attachment means intended for mounting purposes.

In one embodiment of the invention, step c) involves bending the formed material along parallel longitudinal directed bending lines of the cable tray thereby forming the two bars of the ladder. The whole cable mesh ladder is then produced from a single flat sheet of metal by punching, forming and bending operations.

In one embodiment of the invention, step a) and step b) is a simultaneously combined processing step, which means that punching and forming is being made simultaneously in a single production step. The forming process also involves pressing and plastically stretching the material.

In one embodiment of the invention the final form of the cable tray being heat treated, for example by annealing in order to reduce stresses in the material or to give the material a hardening process.

In one embodiment of the invention the final form of the cable tray being surface treated. This surface treatment involves often coating with zinc by a galvanizing process. Also a thermoplastic coating can be used.

BRIEF DESCRIPTION OF THE DRAWINGS

The invention will now be described in more detail with reference to exemplifying embodiments thereof illustrated in the accompanying drawings, in which.

DESCRIPTION OF THE INVENTION

Figure 1:
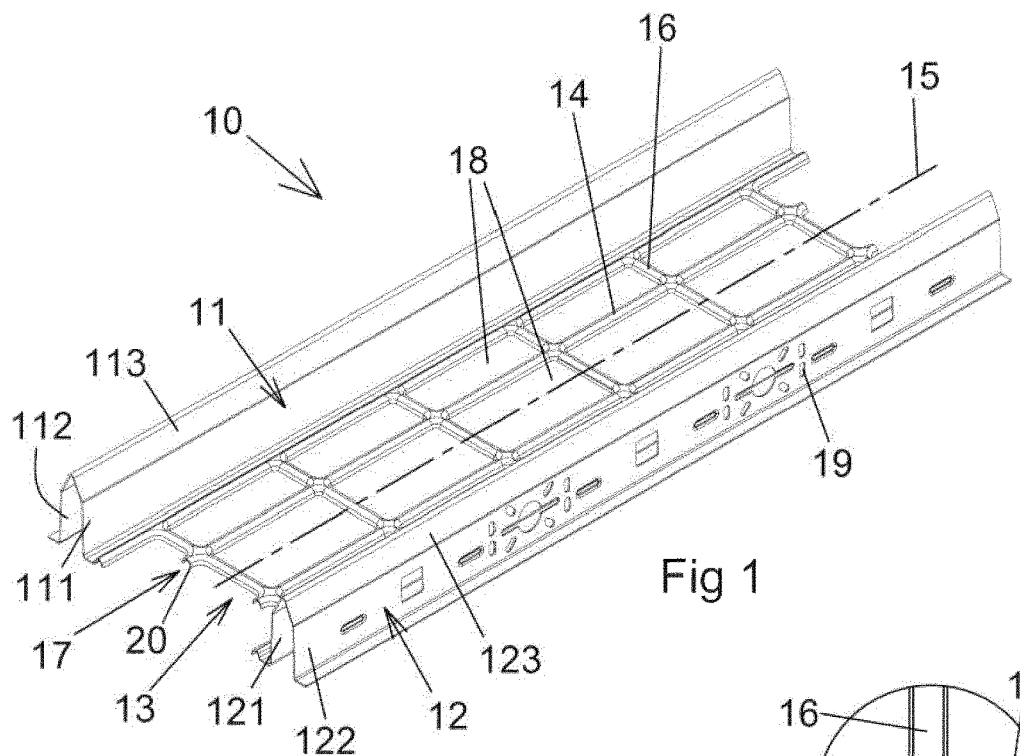
FIG. 1 illustrates in perspective an embodiment according to the present invention.

FIG. 1 illustrates a first embodiment of a hybrid cable tray 10 of a mesh/ladder/wire type. The cable tray is provided with a first side bar 11 and a second side bar 12 which side bars both are attached longitudinally to separate sides of a first part 13, being a bottom part, of the cable tray 10. Each side bar 11, 12 has an inner side 111, 121 connected to the said first part 13 and an outer side 112, 122 connected to the respective inner side 111, 121 by a closed top side 113, 123. In the figure the initial forming operation of a flat starting metal sheet material by punching and pressing the sheet material has formed first tray members 14 extending in the longitudinally direction 15 of the cable tray 10 and second tray members 16 extending in the transversal direction perpendicular to the longitudinal direction 15, indicated by the centerline in the figure, of the cable tray 10. The form of each tray member 14, 16 is as beams each of which having a cross section in the form of a U-profile 17 with the open side of the U-profile directed outwards from the cable tray 10. Between the tray members 14, 16 the cable tray 10 is provided with through holes 18 over the whole first part 13. For specific purposes a hole can be covered by a cover means or by the metal sheet material not being initially punched.

After the initially punching step forming the through holes 18 and also a number of mounting holes as attachment means 19 in the flat metal sheet material, a second step defined as a strip forming operation is taken place. During this strip forming operation the excess border material along all openings and all edges in the first part are bent 90° in the same direction from the flat surface of the starting metal sheet surface. This strip forming operation contains both a bending operation and a plastic forming operation of the metal sheet. The tray members is a result from this bending operation where edges 20 of said through holes 18 has been bent an angle δ thus forming these members. The possible angles δ for making up these tray members is in the interval of 45°<δ<180°. The angle 180° corresponds to a circular cross section of the tray member and an angle of 90° corresponds to a U-shaped cross section of the tray member. A further method step is to bend the flat outer areas on both sides of the starting metal sheet into the first and second side bars 11, 12. The result of the starting metal sheet material after these forming steps is disclosed in FIG. 1.

The first step being a punching operation and the second step being a forming operation can be made in a single combined punching/forming operation step, however punching by making openings and forming by bending and stretching the edges will be made during such a combined step.

Figure 2:
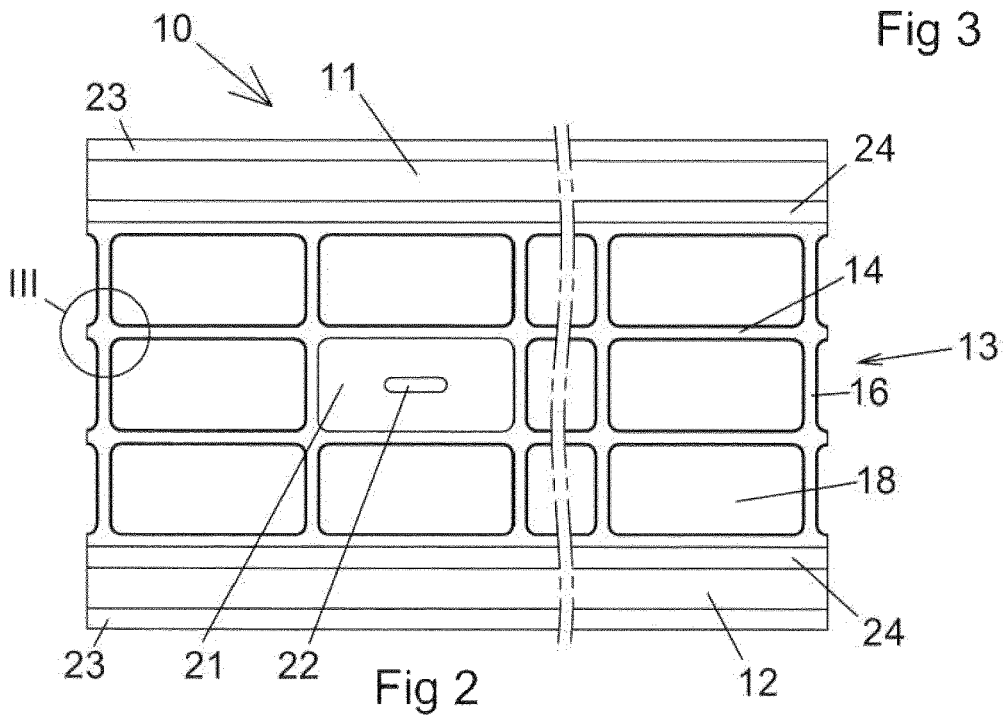
FIG. 2 discloses a bottom view of the embodiment in FIG. 1.

FIG. 2 discloses a bottom view of the cable tray 10 with the beams in the form of first tray members 14 and second tray members 16. Also a cover member 21 and its mounting hole 22 can be seen in the figure. Cover member/members with the respective mounting hole can of course be located in one or more of the openings located on the side parts of the cable tray. These cover members can be provided as "closed through holes" produced by not stamping such through holes in the metal plate in the production step of the cable tray. Other types of attaching means for various devices other than mounting holes can be provided in the cover member. As is recognized from this bottom view is that the U-shaped beams are orientated so that the open side of the beams cannot be seen in a top view of the cable tray. The through holes 18 in the cable tray are in this embodiment rectangular. It is also clear from the figure by the curved center lines that cable trays according to the invention can be produced in different suitable lengths. The connections III between each first tray member 14 and each second tray member 16 are made as part of the members since the tray members are produced from the same sheet of metal. Each side bar 11, 12 are provided with an outer rim 23 extending substantially perpendicular out from the bottom edge of the outer side 112, 122 of the respective side bar 11, 12. Furthermore, the inner side 111, 121 of the respective side bar 11, 12 is provided with an inner rim 24 extending substantially perpendicular inwards from the bottom edge of the inner side of the respective side bar 11, 12 and to which inner rim 24 the said first part 13 is attached. Preferably the outer rim 23 and the inner rim 24 together define flat surfaces which are flush with each other defining a support surface.

The open profiles facing in the same directions in the cable tray has the advantages of that the cable tray sections can be stacked on each other requiring minimum extra storage volume at transport of the cable trays.

Figure 3:
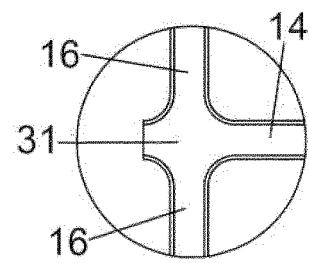
FIG. 3 discloses an enlarged view III from FIG. 2.

FIG. 3 discloses en enlargement view III from FIG. 2 of the connection area 31 between a first tray member 14 and two second tray members 16. The connection area 31 also constitutes an open profile corresponding to and being aligned with the U-shaped tray members 14, 16. This connection area 31 has been produced simultaneously with the tray members in an elastically forming operation.

Figure 4:
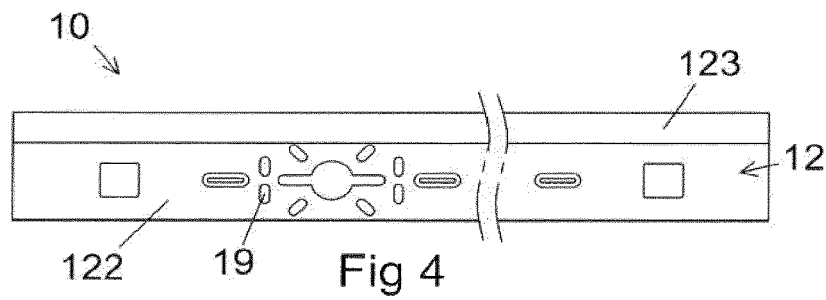
FIG. 4 discloses a side view of the embodiment in FIG. 1.

FIG. 4 discloses a side view of the cable tray 10 where the side bar 12 is provided with attachment means 19 in the form of various shapes of holes in the outer side 122 of the side bar. Also the closed top side 123 of the side bar 12 is indicated in the figure.

Figure 5:
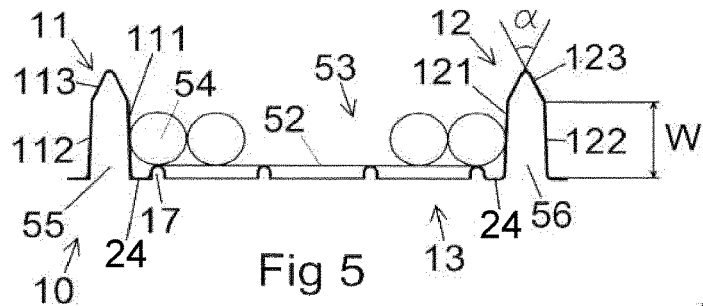
FIG. 5 discloses an end view of the embodiment in FIG. 1.

FIG. 5 is an end view of the cable tray 10 in FIG. 1 clearly disclosing that the longitudinally directed tray member having a U-shape 17 with its open sides of the U-profiles directed outwards from the cable tray. The figure also discloses the two side bars 11, 12 each connected by its inner side 111, 121 via connections 23 to the respective longitudinal side of the first part 13. The first part 13 is forming a first support surface 52 of a first accommodation 53 for a plurality of cables 54 in the cable tray 10. Each side bar 11, 12 is provided with at least one closed top side 113, 123 and one outer side 112, 122 where the inner side 111, 121 and the outer side 112, 122 have about the same width W and that the side bars 11, 12 each has an open bottom side 55, 56.

Figure 6:
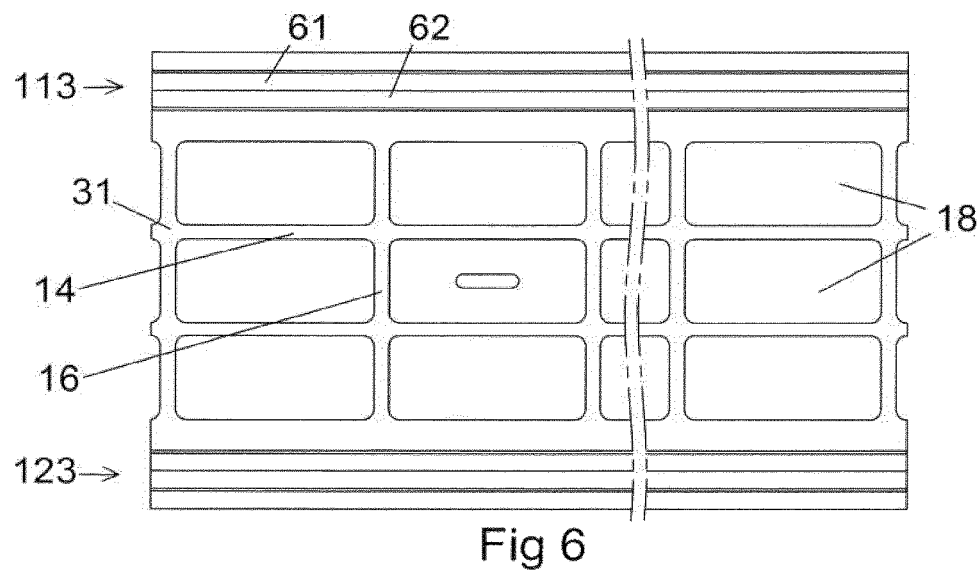
FIG. 6 discloses a top view of the embodiment in FIG. 1.

FIG. 6 discloses a top view of the cable tray 10 with the beams in the form of first tray members 14 and second tray members 16. Also the cover member 21 and its mounting hole 22 can be seen in the figure. Other types of attaching means for various devices than mounting holes can be provided in the cover member. As is recognized from this top view is that the U-shaped beams are orientated so that the open side of the beam cannot be seen in a top view of the cable tray. This orientation is important since it will avoid damaging the electrical cables supported by the cable tray. The holes 18 in the cable tray are in this embodiment rectangular. It is also clear from the figure by the curved center lines that cable trays according to the invention can be produced in different suitable lengths. As previously described the connection area 31 between each first tray member 14 and each second tray member 16 are made as part of the members since the tray members are produced from the same sheet of metal. Each top side 113, 123 of the two side bars 11, 12 is formed with an outer top surface 61 and an inner top surface 62 each of which together forms a top angle α of the top side of the side bar in the interval of 45-60°, preferably α=50°. This angle α can clearly be seen in FIG. 5.

Figure 7:
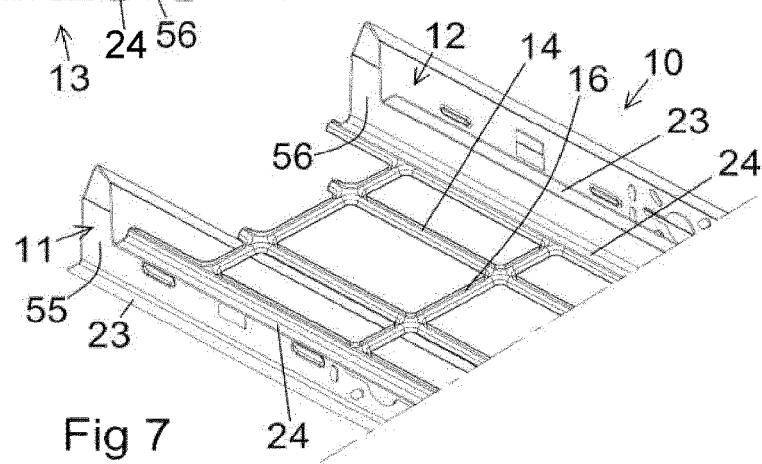
FIG. 7 illustrates in perspective an end view from below of the embodiment in FIG. 1.

FIG. 7 discloses in a perspective view from the underside of an end part of the cable tray 10. The first tray members 14 extending in the longitudinally direction 15 of the cable tray 10 and second tray members 16 extending in a transverse direction are seen with their respective open sides facing out from the accommodation of the cable tray. Each side bar 11, 12 have its open sides 55, 56 facing in the same direction as the open sides of the tray members 14, 16. The outer rim 23 and the inner rim 24 of the side bars 11, 12 lies flush with each other thereby defining a resting support surface for handling, mounting and storing the cable tray sections.

As can be seen from the figures, producing cable trays according to the present invention makes it also possible to cut the cable tray to a desired length near the connection areas of the tray.

I other embodiments than the one disclosed in the figures the tray members might be arranged with other angles between each other and also towards the longitudinal direction of the cable tray. Furthermore, an end of a second tray member might not only attach to the end of the first tray member as disclosed in the figures but instead attach to a first tray member in the middle thereof and thus providing a different arrangement of holes in a cable tray according to the invention.

The tray members might not only together define a flat bottom surface but tray members can be curved in order to define tray member ridges or bulbs on the otherwise flat bottom surface, for example to provide side stop means for the cables in the cable tray. The invention also cover embodiments in which the first tray members provides a different bottom level than the second tray members, for example the first tray members defines a higher bottom surface than the second tray members thereby defining ridges holding the electrical cables in firm lateral position in the cable tray.

The invention claimed is:

1. A hybrid cable tray comprising:
a first part comprising one piece having a uniform thickness, the first part forming at least a support surface of a first accommodation for the plurality of cables, the first part having a plurality of first through holes formed by a first plurality of edges in the first part; and
two parallel extending side bars connected to each other by the first part, the side bar having an inner side connected to the first part and with at least one closed top side and one outer side and an open bottom side;
wherein the closed top side of the side bar comprises two flat surfaces symmetrically arranged in the side bar with an angle α towards each other where the angle α is in the interval of 45-60° and together providing a top edge of the closed top side of the side bar;
wherein the inner side has a first width;
wherein the outer side has a second width approximately equal to the first width; and
wherein each of the side bars is substantially symmetrical about a plane bisecting the closed top side along a length of the side bar.

2. The hybrid cable tray according to claim 1, wherein at least one side bar, preferably both side bars, is formed from the one piece.

3. The hybrid cable tray according to claim 1, wherein at least a part of each of the plurality of edges protrudes and is directed with an angle δ away from the support surface of the first accommodation, where 45°<δ<180°.

4. The hybrid cable tray according to claim 3, wherein the first plurality of edges of the at least one through hole is orientated at the angle δ from the support surface.

5. The hybrid cable tray according to claim 4, wherein the first plurality of edges of the at least two adjacent through holes in the first part is orientated at the angle δ from the support surface.

6. The hybrid cable tray according to claim 1, wherein the through holes are formed and located in relation to each other so that the plurality of edges of two adjacent through holes defines a tray member formed as a beam with longitudinally uniform cross shape at least partly between adjacent located through holes, preferably the beam having a cross section in the form of a U-profile.

7. The hybrid cable tray according to claim 1, wherein the outer side of the side bar is provided with an outer rim extending substantially perpendicular out from a bottom edge of the outer side of the side bar.

8. The hybrid cable tray according to claim 1, wherein the inner side of the side bar is provided with an inner rim extending substantially perpendicular inwards from a bottom edge of the inner side of the side bar and to which the inner rim of the first part is attached.

9. The hybrid cable tray according to claim 1, wherein the inner side and/or the outer side of the side bar is provided with attachment means, preferably in the form of holes.

10. A hybrid cable tray comprising:
a first part constituting one piece having a uniform thickness, the first part forming at least a support surface of a first accommodation for the plurality of cables, the first part having a plurality of first through holes formed by a first plurality of edges in the first part; and
two parallel extending side bars interconnected to each other by the first part, the side bar having an inner side connected to the first part and with at least one closed top side and one outer side and an open bottom side, characterized in that the closed top side of the side bar comprises two flat surfaces symmetrically arranged in the side bar with an angle α towards each other where the angle α is in the interval of 45-60° and together providing a top edge of the closed top side of the side bar;
wherein the inner side and the outer side have about the same width;
wherein at least a part of each the plurality of edges protrudes and is directed with an angle δ away from the support surface of the first accommodation, where 45°<δ<180°;
wherein the first plurality of edges of at least one through hole is orientated at the angle δ from the support surface;
wherein the inner side has an inner rim extending substantially perpendicular from a first bottom edge of the inner side;
wherein the outer side has an outer rim extending substantially perpendicular from a second bottom edge of the outer side; and
wherein the inner rim, the outer rim, and the first part are disposed substantially along a plane.

11. The hybrid cable tray according to claim 10, wherein the first plurality of edges of at least two adjacent through holes in the first part is orientated at the angle δ from the support surface.

12. The hybrid cable tray according to claim 11, wherein the through holes are formed and located in relation to each other so that the plurality of edges of two adjacent through holes defines a tray member formed as a beam with longitudinally uniform cross shape at least partly between adjacent located through holes, preferably the beam having a cross section in the form of a U-profile.

13. The hybrid cable tray according to claim 12, wherein the outer side of the side bar is provided with an outer rim extending substantially perpendicular out from a bottom edge of the outer side of the side bar.

14. The hybrid cable tray according to claim 13, wherein the inner side of the side bar is provided with an inner rim extending substantially perpendicular inwards from the bottom edge of the inner side of the side bar and to which the inner rim the first part is attached.

15. The hybrid cable tray according to claim 14, wherein the inner side and/or the outer side of the side bar is provided with attachment means, preferably in the form of holes.

\* \* \* \* \*